United States Patent [19]

Khanna

[11] 4,308,931
[45] Jan. 5, 1982

[54] GUARD FOR DRIVE SHAFT IN AN ARTICULATED TRACTOR

[75] Inventor: Jagdish C. Khanna, Downers Grove, Ill.

[73] Assignee: International Harvester Company, Chicago, Ill.

[21] Appl. No.: 114,437

[22] Filed: Jan. 22, 1980

[51] Int. Cl.³ .......................... B60K 17/22; F16P 1/02
[52] U.S. Cl. .......................................... 180/235; 64/4; 74/609; 180/70 R
[58] Field of Search ................ 180/70 R, 70 P, 235; 64/32 R, 32 F, 3, 4; 74/608, 609

[56] References Cited

U.S. PATENT DOCUMENTS

| | | | |
|---|---|---|---|
| 1,632,214 | 4/1927 | Storey | 180/235 |
| 2,967,432 | 1/1961 | Shane et al. | 74/609 X |
| 3,222,887 | 12/1965 | Barletta | 64/32 R |
| 3,357,206 | 12/1967 | Christie | 64/4 X |

Primary Examiner—Joseph F. Peters, Jr.
Assistant Examiner—Randall A. Schrecengost
Attorney, Agent, or Firm—F. David AuBuchon

[57] ABSTRACT

A guard for a constant-rotating drive shaft in an articulated farm tractor in which a pair of universal joints are connected on either side of a sliding coupler in the drive shaft, the guard having a pair of U-shaped members, one member affixed to a wall with a bearing supporting the drive shaft from the engine on the front frame and the other member affixed to a transfer case on the rear frame. The two members are spaced apart a slight distance in the straight ahead position, but a portion of one member nests within the other member during articulation of the tractor.

2 Claims, 3 Drawing Figures

U.S. Patent  Jan. 5, 1982  4,308,931
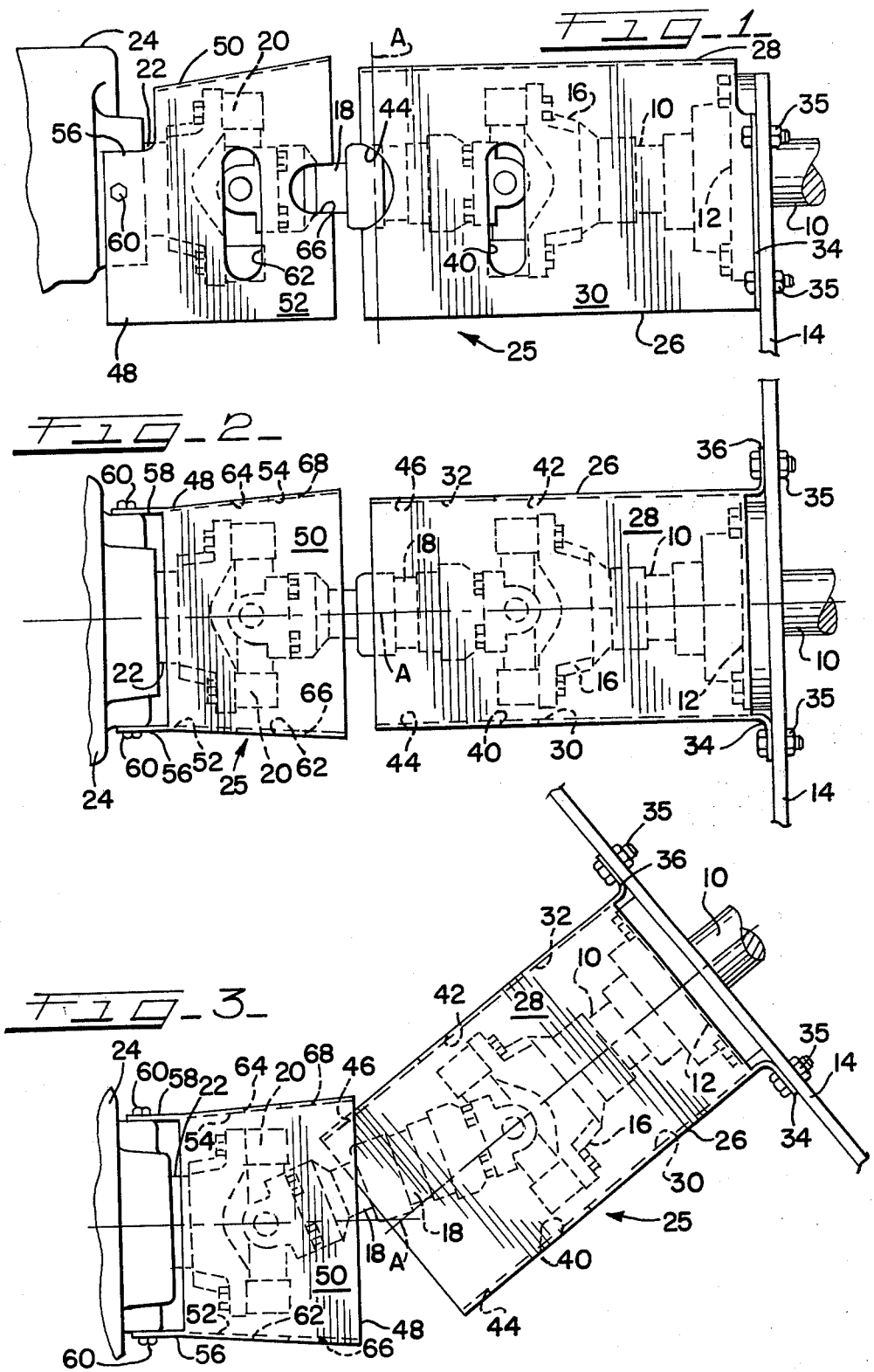

GUARD FOR DRIVE SHAFT IN AN ARTICULATED TRACTOR

BACKGROUND AND SUMMARY OF THE INVENTION

Shields or guards for rotating shafts have been common in the agricultural equipment field for some time. While most of such shields or guards have been provided for rotating shafts that do not alter or change their angular orientation relative to the vehicle during operation, guards have also been provided for power take-off (PTO) drive shafts and the driven shafts on the implements to which they couple, which shafts do angle relative to each other. Because the driven shaft on the implement must be coupled to and uncoupled from the PTO shaft each time the implement is connected to and disconnected from the tractor, such guards must be readily removable and either do not cover lubrication fittings or, if they do, make no special provision for lubrication because any necessary maintenance may be performed when the shafts are disconnected and the shields disabled or otherwise removed.

On certain articulated tractors, the engine is mounted on the front frame section and the main clutch is mounted on the rear frame section. Consequently, the drive line or shaft connecting the engine to the clutch must pass across the articulation joint and will be rotating whenever the engine is running, regardless of whether the tractor is in motion. Should this drive line break while the tractor is in operation, the operator's first inclination would be to arrest further movement of the vehicle by braking. However, until the engine is stopped, that portion of the broken drive line which remained connected to the engine would continue to rotate, and since flexible connections are necessary in this drive line to accommodate articulation, that portion will flail about damaging any components on the tractor within its reach.

Any guard for the drive shaft extending across the tractor's articulation point must accommodate the angular changes and still provide the shielding necessary to discourage contact between the shaft and any object that would be thrown by or would do damage to the shaft should contact occur while the shaft is rotating. In addition, the guard should permit lubrication of component parts of the drive shaft without removal or disablement thereof both with the tractor in any angle of articulation and with the drive shaft coming to rest in any orientation, i.e. any angle about its own axis of rotation.

Since a bellows, such as that disclosed in U.S. patent application Ser. No. 114,434, filed the same day as this application by George E. Bowman, David S. Faust and David T. Kataoka and entitled COVER FOR A TRACTOR'S ARTICULATION SPACE which may be provided as a cover for the area of articulation to improve the appearance of the tractor, is capable of being removed, a guard for a constant running drive line must protect an operator from inadvertant contact therewith, and must diminish the possibility of clothing becoming entangled therein when service or repair operations are performed with the bellows removed and the engine operating.

It is, therefore, an object of this invention to provide a guard for a constant-running shaft crossing the pivot or steering joint of an articulated tractor which discourages contact with the shaft, which accommodates the angular and distance changes due to articulation, which permits lubrication of component parts of said shaft without disturbing the guard, which minimizes damage from the shaft in the event it should break, which discourages both inadvertant contact with the shaft by an operator and which diminishes the possibility of clothing becoming entangled with the shaft.

It is also an object of this invention to provide such a guard for a drive shaft which permits lubrication of drive shaft components in any angle of articulation.

It is a further object of this invention to provide such a drive shaft guard which permits access for limited maintenance to the shaft's component parts regardless of the angular orientation of the shaft at rest.

These and other objects of the present invention, and many of the attendant advantages thereof, will become more readily apparent upon a perusal of the following description and the accompanying drawings, wherein:

FIG. 1 is a side elevation view of a portion of an articulated tractor showing a guard according to the present invention;

FIG. 2 is a top plan view of the guard of FIG. 1; and

FIG. 3 is a top plan view similar to FIG. 2, but showing the tractor in an articulated or angled position.

DESCRIPTION OF A PREFERRED EMBODIMENT

The drive shaft 10 leads from the engine of an articulated tractor that steers by pivotal movement of front and rear frame sections about the axis A. The drive train and articulated frame arrangement may, for example, be similar to that shown in U.S. patent application Ser. No. 114,177, filed the same day as this application by Anthony M. Kestian and Raymond J. Allori and entitled ARTICULATED TRACTOR POWER TRAIN and now abandoned. The drive shaft 10 extends through a bearing 12 secured in an opening of a rigid wall 14 affixed to the front frame of the articulated tractor. A yoke of a universal joint 16 is attached to the end of the shaft 10. A splined collapsible connection 18 is connected at one end to the universal joint 16 and at the other end to a second universal joint 20, which joint is in turn, connected to drive the input shaft 22 of a transfer case 24. The transfer case 24 is affixed to the rear frame section of the articulated tractor. As can be seen by reference to FIGS. 2 and 3, the two frame sections pivot about the axis A and consequently the two universal joints 16 and 20 accommodate the resulting angular change between the drive shaft 10 and the input shaft 22, with the splined connection 28 compensating for the slight change in distance between the two universal joints 16 and 20 as the tractor articulates.

The guard, indicated generally at 25, is comprised of two portions. One portion is a generally U-shaped member 26 having a flat top 28 with downward depending side walls 30 and 32. A flange 34 and 36 formed on the side walls 30 and 32 respectively permits the member 26 to be secured to the rigid wall 14 by conventional fasteners, such as nuts and bolts 35. The member 26 has a uniform cross section for purposes to be explained hereinafter. Each of the side walls 30 and 32 is provided with an elongate opening, 40 and 42 respectively, which openings are aligned with the bearing portions of the universal joint 16. These openings 40 and 42 permit access to the joint bearings for lubrication thereof with the guard member 26 secured in its intended position as shown in the drawing. Circular notches 44 and 46 are provided in the free ends of the side walls 30 and 32 respectively to provide clearance for the sliding coupling 18 during maximum angular articulation.

A second guard member 48 also has a generally U-shaped configuration with a flat top 50 and a pair of side walls 52 and 54. An extension 56 and 58 on the side walls 52 and 54 respectively permits attachment of the guard member 48 to the transfer case 24 by conventional fasteners, such as bolts 60. The top 50 and the side walls 52 and 54 all flare outward toward the guard member 26, so that the outline or cross section of the member 48 is progressively larger the further the section is taken from the transfer case 24. This permits the uniformly cross-sectioned guard member 26 to enter or nest within the guard member 48, without interferences, as the tractor articulates, as shown in FIG. 3.

The side walls 52 and 54 of the guard member 48 are provided with elongate openings 62 and 64 respectively, which are aligned with the bearings of the universal joint 20 for lubrication thereof. Elongate notches 66 and 68 are provided in the free ends of the side walls 52 and 54 respectively to permit access to lubrication fittings on the splined connection 18.

Both the guard members 26 and 48 are formed of sheet steel having sufficient thickness and strength to restrain those components of the drive shaft 10 that remain affixed thereto in event of a failure. It has been found acceptable to form these members of a sheet steel having a thickness of ⅛ inch when an SAE 1025 steel material is utilized.

As will be seen from the foregoing, the guard described provides protection against contact with the component parts of a constant running drive line and significantly discourages contact with the protruding parts of that drive line, such as universal joints, accommodates the angular and distance changes resulting from articulation, and permits necessary periodic lubrication of the universal joints and splined connection with the guard in its intended position. Various changes and modification therein may occur to those skilled in the art without departing from the spirit of the invention as defined by the scope of the appended claims.

What is claimed is:

1. In an articulated tractor having front and rear frames pivotally interconnected to define an axis of articulation, an engine mounted on the front frame, a drive shaft connected to and at all times rotatable with the engine and extending toward the rear frame, a support wall on said front frame rearward of the engine, a bearing secured to said wall and rotatably supporting said drive shaft, a first universal joint secured to said drive shaft, a sliding coupler connected to said first universal joint and extending between said frames, a second universal joint secured to said coupler, a transfer case mounted on said rear frame and having an input shaft secured to said second universal joint; an arrangement to minimize damage to adjacent tractor components should either of said joints fail comprising:

a first guard member having a U-shaped cross-section connected to said wall and covering that portion of said drive shaft rearward of said wall, said first universal joint and a portion of said coupler;

a second guard member having a U-shaped cross-section connected to said transfer case and covering said input shaft, said second universal joint and a portion of said coupler;

each of said guard members having an upper member and a pair of downward depending side members defining adjacent vertical edges;

the U-shaped cross-section of one guard member being larger than the cross-section of the other so that a portion of the smaller may nest within the larger as the vehicle is articulated about said axis; and notches provided in the adjacent edges of the side members of the smaller guard member to provide clearance for said coupler during articulation.

2. The invention according to claim 1, wherein each of said side members is provided with a vertical slot aligned with the adjacent universal joint to permit access thereto for lubrication of said joints; and the adjacent edges of the side members of said larger guard member are provided with notches to permit lubrication of said coupler.

* * * * *